(12) United States Patent  
Soler Garrido

(10) Patent No.: US 9,077,397 B2  
(45) Date of Patent: Jul. 7, 2015

(54) TRANSCEIVER, SYSTEM AND METHOD FOR SELECTING AN ANTENNA

(71) Applicant: KABUSHIKI KAISHA TOSHIBA, Tokyo (JP)

(72) Inventor: Josep Soler Garrido, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 78 days.

(21) Appl. No.: 13/899,824

(22) Filed: May 22, 2013

(65) Prior Publication Data

US 2014/0004803 A1 Jan. 2, 2014

(30) Foreign Application Priority Data

May 22, 2012 (GB) .................................. 1209037.9

(51) Int. Cl.
| | |
|---|---|
| H04B 1/44 | (2006.01) |
| H04B 7/04 | (2006.01) |
| H04B 7/08 | (2006.01) |
| H01Q 3/24 | (2006.01) |
| H04B 7/06 | (2006.01) |

(52) U.S. Cl.
CPC ............. *H04B 7/04* (2013.01); *H04B 7/0802* (2013.01); *H01Q 3/24* (2013.01); *H04B 7/0602* (2013.01)

(58) Field of Classification Search
USPC ............... 455/83, 88; 333/101, 103, 105, 262
See application file for complete search history.

(56) References Cited

U.S. PATENT DOCUMENTS

| | | | |
|---|---|---|---|
| 6,940,363 B2 * | 9/2005 | Zipper et al. ................... 333/103 |
| 7,184,717 B2 * | 2/2007 | Rose et al. ....................... 455/83 |
| 7,663,456 B2 * | 2/2010 | Subramanian et al. .......... 335/78 |
| 8,022,745 B1 * | 9/2011 | Dening et al. .................. 327/309 |
| 8,687,325 B2 * | 4/2014 | Premerlani et al. ............. 361/13 |
| 2003/0124986 A1 | 7/2003 | Rose et al. |

FOREIGN PATENT DOCUMENTS

WO WO 2004/061882 A1 7/2004

OTHER PUBLICATIONS

Office Action issued on May 20, 2014 in the corresponding Japanese Patent Application No. 2013-104032 (with English Translation).
United Kingdom Search Report Issued Sep. 24, 2012, in Great Britain Patent Application No. 1209037.9, filed May 22, 2012.

* cited by examiner

*Primary Examiner* — Sonny Trinh
(74) *Attorney, Agent, or Firm* — Oblon, McClelland, Maier & Neustadt, L.L.P.

(57) ABSTRACT

The invention relates to a transceiver operating in a wireless communication network, the transceiver comprising an RF circuit and a selection mechanism for selecting an antenna for communication. The switching mechanism includes one or more electro-mechanical switches and one or more solid-state switches, each being selectable for operation in response to a control signal received from the control system. The solid-state switches are configured to establish an electrical connection between the RF circuit and an antenna if a first condition is satisfied, and are further configured to select an antenna from a plurality of antennas that can be selected by the solid-state switches based on an outcome of a second condition such that the selected antenna is used for communication. If the first condition is not satisfied, the electro-mechanical switches are configured to establish an electrical connection between the RF circuit and an antenna such that this antenna is used for communication by the transceiver.

17 Claims, 3 Drawing Sheets

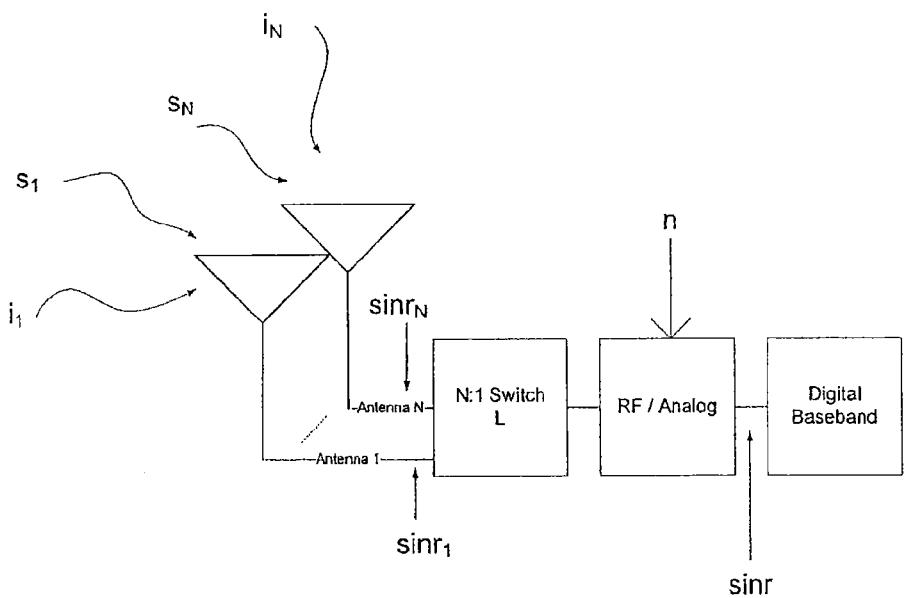
Figure 1- Prior art
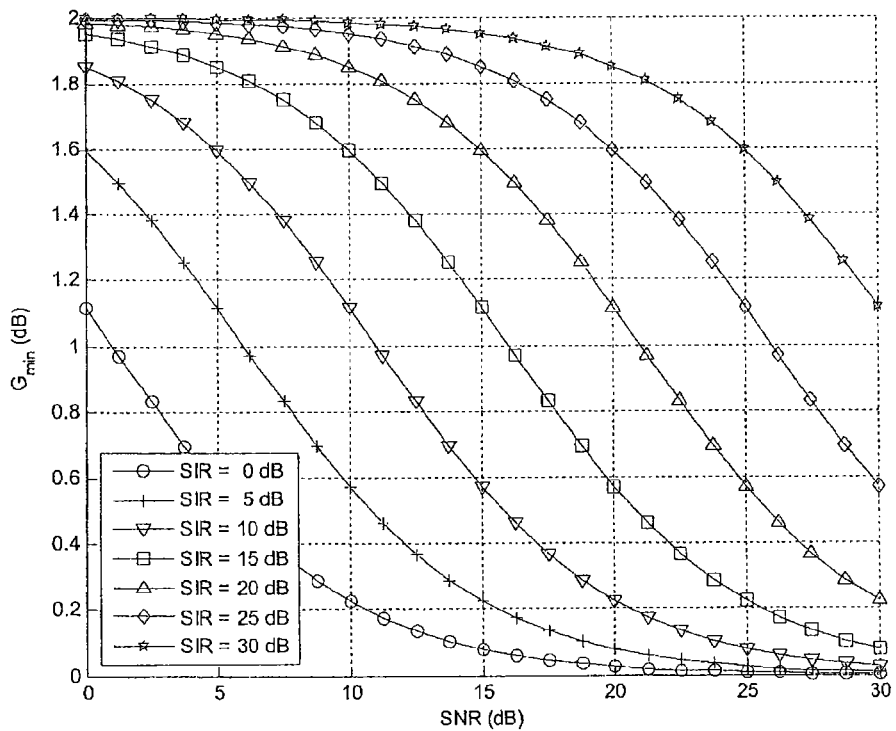
Figure 2. Required minimum antenna selection gain for L=-2dB and different values of SIR and SNR.

TRANSCEIVER, SYSTEM AND METHOD FOR SELECTING AN ANTENNA

FIELD

Embodiments described herein relate generally to a transceiver operating in a wireless communication network, a system and a method for selecting an antenna for communication by the transceiver

BACKGROUND

Practical implementation of transmit/receive antenna selection requires a set of switches in the RF front-end able to connect an RF circuit or a limited number of transmit/receive RF chains to a larger number of antennas. Different types of switching devices can be employed, which can be broadly categorized into solid-state based and electro-mechanical based switches. Solid-state switches are those circuits or devices built entirely from solid materials and in which the charge carriers are confined entirely within the solid material. Common solid-state devices include transistors, microprocessor chips etc. Solid-state switches have the main advantage of achieving faster switching rates as well as lower cost and longer life-spans, but this comes at the cost of a relatively large insertion loss. On the other hand electromechanical and especially MEMS (micro electro-mechanical systems) based switches, have a much lower associated insertion loss, but are typically not suitable for antenna switching in cellular systems due to their large switching delays. MEMS switches are surface-micro machined devices which use a mechanical movement to achieve a short circuit or an open circuit in the RF transmission line When solid-state switches are employed, insertion loss can negate antenna selection gains. Experimental evaluation by the inventors has shown that, for a practical LTE system performing uplink selection (1 element out of 4) under realistic propagation conditions, gains in the order of 2 dB and up to 3 dB can be achieved before accounting for signal loss in the device, depending on the type of channel and amount of interference present. Considering practical single-pole double-throw switches with 1 dB insertion loss, a total attenuation of 2 dB results, which all but negates the advantages of antenna selection if a noise-dominated scenario is assumed. On the other hand, in interference-loaded cases, signal loss at the switches has a smaller impact on receiver signal to interference plus noise ratio (SINR), hence making it easier for antenna selection to deliver net gains.

BRIEF DESCRIPTION OF THE DRAWINGS

FIG. 1 shows an example of a known antenna selection system using switches.

FIG. 2 shows the minimum gain required for different values of signal-to-interference ratio SIR and signal-to-noise ratio SNR for an antenna selection system with a switching loss of 2 dB

DETAILED DESCRIPTION

Figure 3:
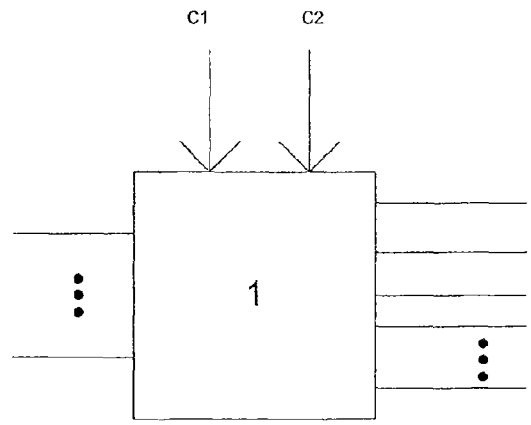
FIG. 3 shows a block diagram of a switching mechanism of an Embodiment with control signals for electro-mechanical and solid-state switches.

There is a desire for an arrangement whereby a transceiver is able to dynamically switch the antenna frontend from one with multiple switchable elements to one where fixed antennas are employed, i.e. having a direct transmission path to a particular antenna so that switching is not needed, based on characteristics of the system and network where the communication is taking place—whether it is dominated by noise or interference or both. One aspect of the embodiments described in this application relates to a transceiver having a hybrid switching mechanism which includes electro-mechanical switches and solid-state switches for dynamically switching the antenna frontend from one with multiple switchable elements to one where fixed antennas are employed, depending on whether or not the particular scenario benefits from antenna switching. By this, antenna selection by switching among a plurality of antennas take place only if the net gain achieved justifies such selection.

According to one embodiment, there is provided a transceiver operating in a wireless communication network comprising an RF circuit and a selection mechanism for selecting an antenna for communication by, the switching mechanism connected to the RF circuit and being connectable to one of a plurality of antennas, the selection mechanism including one or more electro-mechanical switches, one or more solid-state switches and a control system being configured to provide control signals to the switches each of the switches being selectable for operation in response to a control signal received from the control system;

said control system being further configured to select the solid-state switch for operation by sending a control signal to establish an electrical connection between the RF circuit and an antenna via the solid-state switch if a first criterion is satisfied, and otherwise being configured to select the electro-mechanical switch for operation by sending a control signal to establish an electrical connection between the RF circuit and an antenna via the electro-mechanical switch;

said electro-mechanical switch being configured to connect to an antenna such that said antenna is used for communication; and said solid-state switch being configured to select an antenna from the plurality of antennas based on an outcome of a second criterion, such that the selected antenna is used for communication.

In a further embodiment, there is provided a system for selecting an antenna for communication comprising: a transceiver operating in a wireless communication network, the transceiver having RF circuitry and a switching mechanism as set out above for selecting an antenna for communication and connecting the selected antenna to the RF circuitry; and a plurality of antennas, each providing different levels of attenuation when in operation for communication.

In a further embodiment, there is provided a method for selecting an antenna for communication by a transceiver operating in a wireless communication network comprising the steps of:

providing a selection mechanism including one or more electro-mechanical switches and one or more solid-state switches for connecting RF circuitry in the transceiver to one of a plurality of antennas;

establishing an electrical connection between the RF circuit and an antenna via the solid-state switches if a first criterion is satisfied, said solid-state switches being configured to select an antenna from the plurality of antennas based on the outcome of a second criterion such that the selected antenna is used for communication; and establishing an electrical connection between the RF circuit and an antenna via the electro-mechanical switches if the first criterion is not satisfied, said electo-mechanical switches being configured to connect to an antenna such that said antenna is used for communication.

In a further embodiment, there is provided a system for selecting an antenna for communication comprising: a transceiver operating in a wireless communication network, the transceiver having RF circuitry and a switching mechanism having electro-mechanical switches and solid-state switches, the transceiver configured to perform the method set out above;
a plurality of antennas, each providing different levels of attenuation when in operation for communication.

Embodiments of the application are concerned with antenna switching in wireless systems, whereby a small number of RF chains is employed compared to the number of available antennas, so a selection mechanism matches each RF chain with a single antenna to transmit and/or receive signals. This is able to increase performance of wireless systems where the propagation coefficients observed from/to different antennas are sufficiently uncorrelated, hence diminishing the likelihood of experiencing deep fades in all antenna elements at the same time. The arrangement described is a low-cost method to achieve diversity in wireless systems as the number of RF circuits is reduced compared to traditional MIMO systems where each antenna has an associated RF frontend.

Actual implementations of antenna selection systems rely on a set of RF switches able to perform said selection, i.e. able to connect specific antennas to RF circuits via control signals generated according to a decision criterion. For instance, the antenna(s) giving the highest signal to interference plus noise ratio (SINR) or the lowest bit error rate at the receiver are selected. Depending on the channel characteristics, the correlation between antennas, the level of noise and interference present, etc, the gain in terms of SINR attained by means of antenna selection can be higher or lower. For instance, higher gains are expected for channels with low frequency selectivity as the optimal antenna is the same across the entire frequency band.

Considering the antenna selection system of FIG. 1 where for simplicity a single RF chain is assumed, the desired signal power at each antenna is denoted as $s_1 \ldots s_N$ whereas the interfering signal levels are $i_1 \ldots i_N$, and the noise introduced at the RF, Analog and mixed mode sub circuits is denoted as n. Assuming that antenna 1 is selected, the SINR at baseband is given in linear form by $$\sin r_1 = \frac{s_1 L}{i_1 L + n} = \frac{sir_1 snr_1 L}{sir_1 + snr_1 L}$$

where uncorrelated noise and interference is assumed and $$sir_1 = \frac{s_1}{i_1}; snr_1 = \frac{s_1}{n};$$

and L (L<1) represents the loss at the switch.

From the previous expressions the resulting sinr in two extreme cases can be approximated:
a noise dominated case where sir tends to infinity (no interference) and $$\sin r \approx snr_i L$$

an interference case where sir tends to zero and $$\sin r \approx sir_i$$

In the second extreme case, the resulting sinr is not affected by the loss at the switch.

Considering an antenna selection system which in practice selects the antenna that provides the highest sinr and assuming a similar average signal and interference level at all the antennas over time, i.e. the expected strength of the propagation coefficients for desired signal and interference associated to each antenna are the same over a long period of time but subject to instantaneous variations, the effect of antenna selection can be modelled as a gain G on the expected sinr which is given by $$\sin r = \frac{sL}{iL+n} G = \frac{sirsnrL}{sir + snrL} G$$

where s and i are the expected signal and interference levels common to all antennas, and sir and snr are the associated signal-to-interference and signal-to-noise ratios. This value compares to the expected sinr of a conventional system without antenna selection (and hence without the need for a switch i.e. a fixed communication path) which is given by $$\sin r_c = \frac{s}{i+n} = \frac{sirsnr}{sir + snr}$$

Considering the above example, in one embodiment in order for antenna selection to be beneficial the condition that needs to be satisfied may be given as $$\sin r > \sin r_c$$

or equivalently $$G > \frac{sir + snrL}{(sir + snr)L} = G_{min}$$

In this embodiment, as expected, when sir tends to infinity, i.e. in a noise dominated case, the minimum gain needed to achieve a net benefit is 1/L, i.e. the inverse of the switching loss, whereas in the interference loaded case, where sir tends to zero, L does not affect performance and the minimum gain is equal to unity, i.e. all of the antenna selection gain is a net gain. In practice, a situation in between these two extremes is found.

In the above described embodiment, it is assumed in the equations and inequalities that all the antennas have a similar average sinr. This may be the case over longer periods of time especially in mobile scenarios, but in practice over short periods such an assumption may not necessarily hold. The above equations and inequalities simplifications as these and other assumptions are made, and are only denoted to exemplify how; depending on actual noise and interference levels, either antenna selection or fixed-antenna strategies can be advantageous. Therefore, though it is possible to measure actual antenna selection gains and compare them to losses in the switches, in practice a transceiver is likely to select the mode of operation based on actual SINR or error rate measurements.

For instance, in a further embodiment the transceiver may be configured to periodically evaluate the SINR or an error rate achieved with all the possible modes of operations and then decides which one to use for a pre-determined amount of time. Therefore, here a first condition for mode selection will be based on the outcome of this evaluation of a particular metric. Therefore, from among N antennas if the Mth antenna provides the greatest sinr, i.e. if sinr AM>sinr of all other antennas A (1 to N), then the antenna AM which provides this highest sinr is selected using the mode which provides the highest sinr measurement—where AM denotes an antenna among the plurality of antennas A (1 to N). The modes of operation here may be a fixed electrical path mode between the RF circuit and antenna AM via a MEMS switch (a first mode), or a path with switchable elements via a solid-state switch (a second mode). In this embodiment the transceiver therefore directly measures a performance metric (e.g. SINR) rather than calculate it from other values such as switching loss, antenna selection gain, etc as in the previously described embodiment. The performance metric need not be only SINR, and could bit or packet error rates instead. In this case, the antenna AM that provides the lowest error rates in the first and the second modes of operation will be connected to the RF circuit. More than one performance metric can be used to evaluate which mode of operation is to be used in this embodiment. For instance, the antenna which provides the highest sinr and the lowest error rate in both modes of operation may be selected for communication.

In another embodiment, when considering whether to select a 'fixed' antenna i.e. one having a fixed electrical path with the RF circuitry of the transceiver, or an antenna from amongst a group of selectable antennas i.e. the antenna selection group; if one of the antennas of the antenna selection group has very good sinr measurements—even though the average across all is poor and below the sinr of the 'fixed-antenna', the transceiver should be configured to select the 'antenna selection group' using solid state switches and select that particular antenna with the high sinr most or all of the time. Therefore, rather that a fixed selection criterion applying, the transceiver in this embodiment is configured to evaluate that the measured sinr is greater when using the antenna selection group because one of the antennas in this group has the highest sinr, and select that one antenna most of the time, rather than the fixed antenna which is connected to an electro-mechanical switch.

Further selection techniques for considering whether or not a 'fixed antenna' is selected for further communication may be incorporated by the transceiver and the transceiver is not limited to the selection techniques described in the above embodiments. For instance, the transceiver may be configured to perform antenna selection by a particular mode of operation based on characteristics of a different node in the wireless network in which it is operating. Therefore, in one aspect the transceiver may not directly evaluate any metric and instead it receives information to perform selection of mode of operation (selection of whether to use a fixed antenna path or one with switchable elements) from another node in the same network. For instance, a selection method may be aimed to reduce interference caused to another node, and the decision on which mode of operation to use may be based on information received (directly or indirectly) from that node. For instance, this could be information regarding measured interference level, or measured propagation coefficients. These measurements are used by the transceiver to select the preferred mode of operation. In another aspect, the information from the further node may also comprise a direct instruction identifying the preferred mode of operation or in some cases even which particular antenna is to be used. The transceiver is therefore not limited to the selection methods described in the above embodiments when determining if a first condition is met or not, and other methods may be incorporated to select the mode of operation.

FIG. 2 shows the minimum gain required for different values of sir and snr for an antenna selection system with a switching loss of 2 dB. Therefore, a potential problem is that under certain conditions antenna selection does not provide net gains but instead degrades performance due to the loss incurred at the switching devices. This is especially the case when solid-state switches with larger loss are employed.

A potential solution is to use electromechanical or MEMS switches, which typically have a low insertion loss. However they also have a number of associated problems. The main one is related to their large switching delay, which limits their application for instance in cellular systems where base-stations continuously transmit frames with no gaps in time, and selection is performed on a per-frame basis, hence requiring fast switching. Moreover, MEMS switches are typically more expensive and have reduced life spans.

The embodiments overcome these potential problems and in one aspect provides a hybrid switching mechanism (1) using a combination of electro-mechanical devices (1a) and solid-state devices (2a) as depicted in FIG. 3, which results in different L values associated to different antennas. The electro-mechanical devices can be micro electro-mechanical (MEMS) switching means that includes one or more MEMS switches. For a given set of control signals (C1), issued by a control system, the electro-mechanical switches can be configured to establish an electrical connection between the RF circuit in the transceiver i.e. the RF chains, and an antenna. Such an electrical connection via the electro-mechanical switches is a fixed electrical path between the RF circuit and the antenna. For another given set of control signals (C2), the solid-state devices can be configured to select antennas on a per-sub frame basis by establishing an electrical connection between the transceiver RF circuit and an antenna. The solid-state devices could be a switching circuit made up of one or more solid-state switches for performing antenna selection. The electrical connection via the solid state switches is not a fixed path and has switchable elements such that the solid state device is configured to connect one of a plurality of antennas by performing antenna selection.

Whether the electromechanical switches (such as MEMS switches) are used or the solid state switches are to used for establishing a connection between the RF circuits and an antenna is determined by the control system based on the outcome of a first condition. The control system may be part of the digital baseband block of the transceiver (see FIG. 1 for instance), as it performs the link performance measurements required for establishing electrical connection, and it has a direct interface to the Analog/RF subsystem. In practice the digital baseband implementation including the control system can take many forms, like integrated circuits, digital signal processors, FPGAs, etc. The control system selects an overall electrical path from each RF chain to an antenna across potentially many switches, by configuring these switches, i.e. choosing which of the possible paths in each individual switch is to be activated. This overall path can be a low loss one (most likely through MEMS switches) or a higher loss one (through solid state ones), but which offers the advantage of being able to switch fast enough to perform antenna selection.

The actual selection of either the electromechanical switches or solid state switches to connect to an antenna based on a decision by the control system may be done via a switch. This could be via one or more MEMS switches where MEMS controls can be employed for longer term antenna switching or to select between lower and higher loss paths depending on whether communication is taking place in an interference or noise-limited case. Deciding by the control system whether to use the electro-mechanical switches (MEMS) or the solid state switches and issuing control signals accordingly, can be based on a criterion such as the value of the net gain (G) value as described above or based on SINR comparisons between a fixed antenna path and a switchable system.

For instance, referring to the above equations/inequalities, in order for antenna selection to be beneficial the criterion that needs to be satisfied is $$\text{sinr} > \text{sinr}_c$$

or equivalently $$G > \frac{sir + snrL}{(sir + snr)L} = G_{min}$$

where sir, snr, sinr and $\text{sinr}_c$ are indicated as explained above.

Therefore in one embodiment, if the gain offered by antenna selection is more than the switching losses such that it is advantageous, i.e. G>L, then the control system determines that it is justified to use an antenna switching mode with solid state switches (1b) and issues control signal C2 accordingly so that antenna selection is performed using the solid state switches (1b). Otherwise, if the criterion is not satisfied and if the control system determines that the gain provided by antenna switching is not justified, or if a fixed path antenna is preferable according to the instant scenario, then the control system issues control signal C1 to activate the MEMS switches (1a), which are connected to a fixed path antenna. This way, the antenna front end can be switched from a fixed antenna, i.e. having a direct or fixed connection path without any switching elements, to one with switchable elements depending on whether or not the control system determines that the gain offered by antenna switching is justified. Selection of the antenna frontend itself is done by using switches. As the transition from a noise-dominated to an interference-dominated one and vice-versa is a slow process, electro-mechanical or MEMS switches can be used for the purpose of selection of a fixed antenna or the solid state switches, hence incurring little additional loss.

Figure 4:
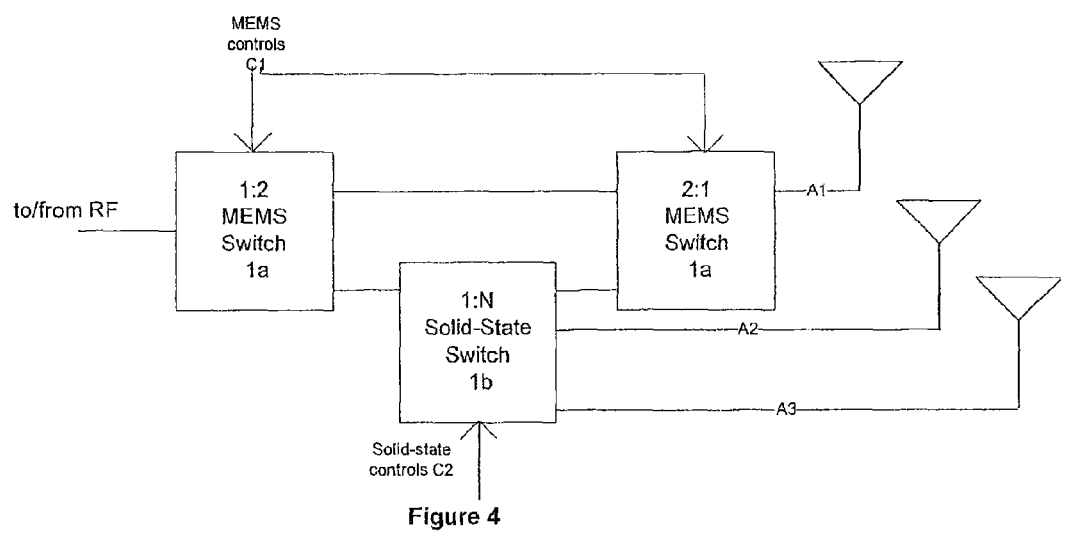
FIGS. 4 and 5 show examples of the implementation of the switching mechanism shown in FIG. 3.

A more specific example for a 1 to N antenna selection is shown in FIG. 4. In this embodiment a hybrid switching mechanism is having a first MEMS switch (1:2 1a) connected to an RF circuit of the transceiver and also having an electrical path to connect to a solid state switch (1b), and a second MEMS switch (2:1 1a). The second MEMS switch (2:1 1a) has a fixed electrical path to an antenna A1 The solid-state switch (1b) has a switchable electrical path that can connect to one of N antennas on being configured by the control system, with N being the number of antennas that the solid-state switch is capable of connecting to. The first MEMS switch is configured using control signals to establish electrical connection between the RF circuit and one of the N antennas via either the second MEMS, or via the solid state switch based on the outcome of the first condition. If the second MEMS is chosen, the resulting electrical path will be a fixed electrical path to antenna A1. If the solid state switch (1b) is chosen, the solid state switch performs antenna switching between N antennas based on the outcome of a second condition the resulting path is chosen accordingly.

In the embodiment shown in FIG. 4, the solid-state switch is also capable of connecting to Antenna A1 via the second MEMS switch (1a). Therefore the second MEMS switch— can be selected to provide a fixed electrical path to antenna A1 via the first MEMS switch (1a), or to provide a switchable electrical path having selectable elements via the solid state switch (1b) such that antenna A1 can also be selectable by said switch (1b).

In this embodiment, the MEMS switches (1:2 1a, 2:1 1a) are used to select antenna A1. If upon determination by the control system that the first condition is not satisfied, i.e. if gain G offered by antenna switching or selection is not justified, then control signal C1 is issued which activates the fixed electrical connection between that RF circuit and antenna A1 via the two MEMS switches. The solid-state switches will not be selected by the first MEMS switch (1:2 1a), and therefore will not be connected to the RF circuitry of the transceiver for communication. The switchable electrical path is therefore not activated. Choosing the top branch shown in FIG. 4, i.e. the fixed antenna A1, is done with a low overall switching loss (twice the loss in a MEMS device).

If the control system on the other hand determines that the first condition is satisfied, i.e. gain G provided by antenna selection is justified, then control signal C2 is issued to activate the switchable electrical path between the RF circuit and an antenna for communication via the solid-state switch. The solid state switches (1b) can then make a selection between N antennas, including antenna A1. The first MEMS switch connects the solid state switch to the RF circuitry of the transceiver when control signal C2 is issued to form the switchable electrical connection path.

Once this path is activated, the antenna is selected using conventional antenna selection/switching techniques. For instance, the solid-state switch can select an antenna that satisfies a second condition such as: selecting one providing the highest signal to interference plus noise ratio (sinr). This second condition can also be based on monitoring of performance parameters such as bit-rate-error or packet-rate-error and choosing the antenna that provides the best performance based on the second criterion. In FIG. 4, choosing the bottom branch provides an antenna-switching mode through a larger solid-state switching fabric depending on the outcome of the second criterion.

In FIG. 4 the top branch would be selected if antenna selection does not offer benefits, which is more likely to happen when interference levels are low or if there are no interferers. Otherwise, if antenna selection offers advantages despite a high switching loss i.e. if $$\text{sinr} > \text{sinr}_c$$

or equivalently $$G > \frac{sir + snrL}{(sir + snr)L} = G_{min}$$

then the lower path through a solid-state switch is chosen and conventional antenna selection can be performed.

Figure 5:
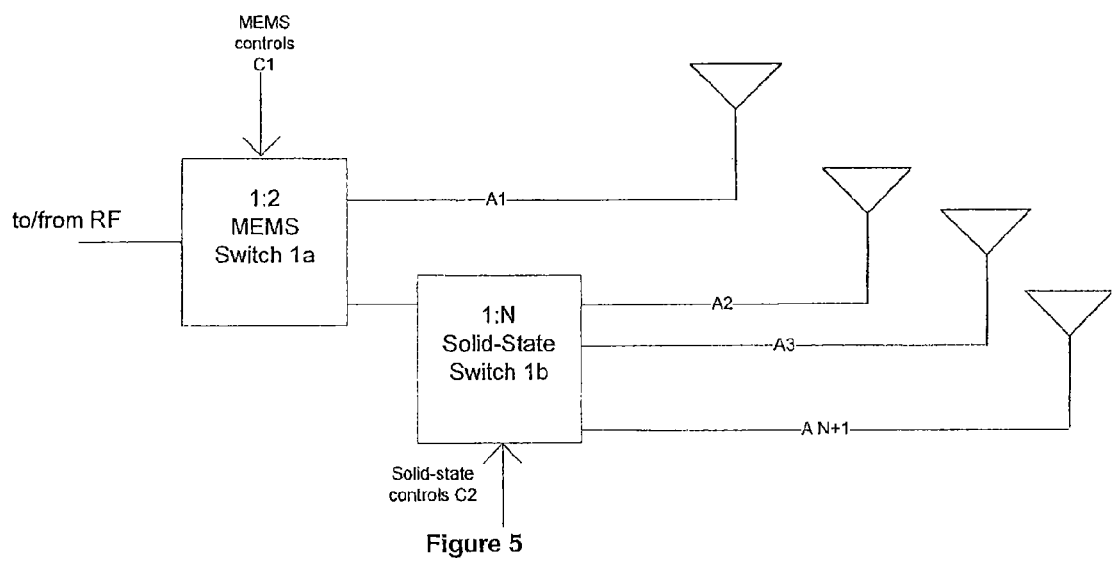

Depending on the type of antenna employed, it may be preferable in terms of cost to add an extra antenna for the low-loss option and use the 1 to (N+1) arrangement as shown in FIG. 5. This embodiment is different to the FIG. 4 embodiment in that the second MEMS switch (2:1 1a) is not present. Here, the antenna A1 that has a fixed connection path to the RF circuitry via the MEMS switch 1a cannot be selected by the solid state switch. Therefore, one additional (N+1) antenna will be needed so that selection by the solid state switch can be amongst N antennas, i.e. 2 to N+1 antennas can be selected by the solid state switch (1b) based on the outcome of the second condition. This embodiment has the advantage that only a single MEMS switch is required and the loss for the first antenna is half of that in the previous arrangement in FIG. 4.

In practice, once the switching mechanism decides on using solid-state switches, the antenna selection system can be trained by measuring signal to noise and signal to interference ratio in order to select the most appropriate mode of operation, either according to a fixed equation or table, for instance the previous expression for the minimum G, or most likely by regularly measuring a performance parameter (be it sinr or bit-error-rate or packet-error-rate) for the different modes and antennas, and selecting the most appropriate ones. Operation and selection can be made in a similar way to conventional systems once the solid-state switches are selected by the switching mechanism.

The described embodiments may be employed for instance in small-cell base station infrastructure products which are to be used in scenarios where interference suppression is required at a low cost and without sacrificing coverage radius. The described embodiments may also be employed for achieving interference suppression in wireless systems without performance degradation in cases where received signal is weak, for instance when a user is at the edge of a cell. Additionally, the embodiments could be used in single carrier spatial-modulation systems facing similar problems, whereby it may be preferable to disable spatial-modulation and use a fixed-antenna instead when communicating with devices with poor signal to noise ratio.

Whilst certain embodiments have been described, these embodiments have been presented by way of example only, and are not intended to limit the scope of the inventions. Indeed, the novel devices, methods and products described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A transceiver operable in a wireless communication network, the transceiver comprising an RF circuit and a selection mechanism for selecting an antenna for communication, the selection mechanism connected to the RF circuit and being connectable to one of a plurality of antennas, the selection mechanism including one or more electro-mechanical switches, one or more solid-state switches and a control system being configured to provide control signals to the switches, each of the switches being selectable for operation in response to a control signal received from the control system;

said control system being further configured to select the solid-state switch for operation by sending a control signal to establish an electrical connection between the RF circuit and an antenna via the solid-state switch if a first antenna selection criterion is satisfied, and otherwise being configured to select the electro-mechanical switch for operation by sending a control signal to establish an electrical connection between the RF circuit and an antenna via the electro-mechanical switch;

said electro-mechanical switch being configured to connect to an antenna such that said antenna is used for communication; and said solid-state switch being configured to select an antenna from the plurality of antennas based on an outcome of a second antenna selection criterion, such that the selected antenna is used for communication.

2. The transceiver according to claim 1 wherein said electro-mechanical switch is configured to electrically connect the RF circuit to an antenna to form a fixed communication path, and wherein said solid-state switch is configured to electrically connect the RF circuit to an antenna via a switchable communication path having one or more switching elements for selecting the antenna from a plurality of antennas that can be selected by the solid state device.

3. The transceiver according to claim 2 wherein the first antenna selection criterion is given by:

$$G > L$$

where G is the net gain delivered by selecting an antenna from a plurality of antennas using the switches and L is the switching loss associated with the switches.

4. The transceiver according to claim 2 wherein said first antenna selection criterion is based on monitoring a performance parameter P of the plurality of antennas in a first and a second mode of operation and is given by:

if PM is better than P of other antennas A, where PM refers to the performance parameter P of antenna M which is the Mth antenna among the plurality of antennas A, then antenna AM which provides the best performance in terms of P among the plurality of antennas is electrically connected to the RF circuit;

where AM denotes the Mth antenna among the plurality of antennas A; where in the first mode the RF circuit is electrically connected to antenna AM to form a fixed electrical path via the electromechanical switch, and in the second mode the RF circuit is electrically connected to antenna AM to form a switchable path via the solid-state switch for selecting an antenna from the plurality of antennas.

5. The transceiver according to claim 2 wherein said first antenna selection criterion is given by:

$$sinr > sinr_c$$

sinr being the signal-to-interference plus noise ratio for the plurality of antennas that can be selected for communication, and $sinr_c$ being the signal-to-interference plus noise ratio of an antenna without using antenna selection;

where the plurality of antennas have a similar average signal power and interference level over time, subject to instantaneous variations.

6. The transceiver according to claim 2 wherein said first antenna selection criterion is given by:

$$G > \frac{sir + snrL}{(sir + snr)L} = G_{min}$$

where s=signal power;
i=interference level;
n=noise introduced at RF analog and mixed mode sub circuits;
L=loss experienced at the switches;
G=net gain delivered by selecting an antenna from a plurality of antennas using the switches;
$G_{min}$=minimum net gain to justify selecting from the plurality of antennas using the switches;
sir=signal-to-interference ratio=s/i; and
snr=signal-to-noise ratio=s/n
where the plurality of antennas have a similar average signal power and interference level over time, subject to instantaneous variations.

7. The transceiver according to claim 1 wherein the first antenna selection criterion is given by:

$$G > L$$

where G is the net gain delivered by selecting an antenna from a plurality of antennas using the switches and L is the switching loss associated with the switches.

8. The transceiver according to claim 1 wherein said first antenna selection criterion is based on monitoring a performance parameter P of the plurality of antennas in a first and a second mode of operation and is given by:
- if PM is better than P of other antennas A, where PM refers to the performance parameter P of antenna M which is the Mth antenna among the plurality of antennas A,
- then antenna AM which provides the best performance in terms of P among the plurality of antennas is electrically connected to the RF circuit;
- where AM denotes the Mth antenna among the plurality of antennas A; where
- in the first mode the RF circuit is electrically connected to antenna AM to form a fixed electrical path via the electromechanical switch, and
- in the second mode the RF circuit is electrically connected to antenna AM to form a switchable path via the solid-state switch for selecting an antenna from the plurality of antennas.

9. The transceiver according to claim 8 wherein P is the signal to interference plus noise ratio (sinr) and antenna AM which provides the highest sinr among antennas A in the first mode and the second mode of operation is electrically connected to the RF circuit.

10. The transceiver according to claim 8 wherein P is the bit error rate measurement and antenna AM which provides the lowest bit error rates among antennas A in the first mode and the second mode of operation is electrically connected to the RF circuit.

11. The transceiver according to claim 1 wherein said first antenna selection criterion is given by:

$$sinr > sinr_c$$

sinr being the signal-to-interference plus noise ratio for the plurality of antennas that can be selected for communication, and
$sinr_c$ being the signal- to-interference plus noise ratio of an antenna without using antenna selection;
where the plurality of antennas have a similar average signal power and interference level over time, subject to instantaneous variations.

12. The transceiver according to claim 1 wherein said first antenna selection criterion is given by:

$$G > \frac{sir + snrL}{(sir + snr)L} = G_{min}$$

where s=signal power;
i=interference level;
n=noise introduced at RF analog and mixed mode sub circuits;
L=loss experienced at the switches;
G=net gain delivered by selecting an antenna from a plurality of antennas using the switches;
$G_{min}$=minimum net gain to justify selecting from the plurality of antennas using the switches;
sir=signal-to-interference ratio=s/i; and
snr=signal-to-noise ratio=s/n
where the plurality of antennas have a similar average signal power and interference level over time, subject to instantaneous variations.

13. The transceiver according to claim 1 wherein said second antenna selection criterion for selecting an antenna by the solid-state switch is based on the antenna that provides the highest signal-to-interference plus noise ratio among the plurality of antennas that can be selected by the solid-state switch.

14. The transceiver according to claim 1 wherein said second antenna selection criterion for selecting an antenna by the solid-state switch is based on monitoring a performance parameter of the antennas that can be selected by the solid-state switch, the parameter being any one of signal-to-interference plus noise ratio, bit-error-rate or packet-error-rate, and selecting the antenna that provides the best performance among these antennas in terms said performance parameter.

15. The transceiver according to claim 1 wherein said electro-mechanical switch is a micro electro-mechanical system (MEMS) switch.

16. A system for selecting an antenna for communication comprising:
- the transceiver as claimed in claim 1, operating in the wireless communication network; and
- the plurality of antennas, each providing different levels of attenuation when in operation for communication.

17. A method for selecting an antenna for communication by the transceiver as claimed in claim 1, the method comprising the steps of:
- establishing an electrical connection between the RF circuit and an antenna via the solid-state switches if the first antenna selection criterion is satisfied, said solid-state switch being configured to select an antenna from the plurality of antennas based on the outcome of the second antenna selection criterion such that the selected antenna is used for communication; and
- establishing an electrical connection between the RF circuit and an antenna via the electro-mechanical switches if the first antenna selection criterion is not satisfied, said electro-mechanical switches being configured to connect to an antenna for communication such that said antenna is used for communication.

* * * * *